United States Patent
Philipson et al.

(12) 
(10) Patent No.: US 6,396,994 B1
(45) Date of Patent: May 28, 2002

(54) APPARATUS FOR VARYING THE OPTICAL CHARACTERISTICS OF AN OPTICAL FIBER BY STRETCHING THE FIBER

(75) Inventors: Joshua Philipson, Ottawa (CA); Feliks Lapinski, Fremont, CA (US); Mohiuddin Mala, Ottawa (CA)

(73) Assignee: JDS Uniphase Inc., Nepean ( * ) Notice: Subject to any disclaimer, the term of this patent is extended or adjusted under 35 U.S.C. 154(b) by 0 days.

(21) Appl. No.: 09/523,101

(22) Filed: Mar. 10, 2000

(51) Int. Cl.[7] .............................. G02B 6/00; G02B 6/34
(52) U.S. Cl. ............ 385/136; 250/227.14; 250/227.18; 385/13; 385/37
(58) Field of Search .............................. 385/12, 13, 15, 385/37, 134, 136, 137, 147; 250/227.14–227.19

(56) References Cited

U.S. PATENT DOCUMENTS 6,175,108 B1 * 1/2001 Jones et al. ............ 250/227.14
6,240,220 B1 * 5/2001 Pan et al. .................... 385/13

* cited by examiner

Primary Examiner—John D. Lee
(74) Attorney, Agent, or Firm—Lacasse & Associates, LLC

(57) ABSTRACT

Apparatus for modifying the optical characteristics of an optical fiber by controlled stretching of a length of the fiber, comprising a first fiber holder fixedly carried by a base and capable of firmly holding a first portion of the optical fiber, a lever part attached to the base at a fulcrum, and second fiber holder movably connected to the lever part and capable of firmly holding a second portion of the fiber, so that an intermediate length of fiber may be held taut between said first and second holding means. An electromagnetic circuit moves the lever part between first and second predetermined positions, so that the intermediate length of fiber is stretched as the lever part moves between first and second positions. Preferably, the intermediate length of fiber includes a Bragg grating.

10 Claims, 3 Drawing Sheets

APPARATUS FOR VARYING THE OPTICAL CHARACTERISTICS OF AN OPTICAL FIBER BY STRETCHING THE FIBER

BACKGROUND OF THE INVENTION

1. Field of the Invention

The present invention relates to apparatus for stretching an optical fiber, particularly to alter the optical characteristics of a Bragg grating incorporated in the fiber. The stretching may be used to determine whether a light of certain wavelengths passes through the fiber or is reflected by the grating. The grating can be tuned to particular wavelengths by stretching the fiber.

2. Prior Art

It is known that stretching an optical fiber can alter certain optical characteristics, especially where the optical fiber incorporates a Bragg grating. Such a grating comprises a series of periodic variations in the refractive index of the core of the fiber, and is effective to reflect certain wavelengths of light back along the fiber while allowing other wavelengths to pass.

It has been proposed to alter the reflective characteristics of Bragg grating by stretching or longitudinally compressing the fiber portion containing the grating. Various methods for stretching are discussed in the following U.S. patents: U.S. Pat. No. 5,007,705 issued Apr. 16, 1991 to Morey et al.; and U.S. Pat. No. 5,469,520, issued Nov. 21, 1995 also to Morey et al.

Methods of stretching suggested in these prior patents include:

a) bonding the fiber sections on opposite sides of the grating to locations on a support made of material having a larger coefficient of expansion than that of the fiber, and then varying the temperature of the support;

b) using an electromechanical device, specifically a piezoelectric device, or a stack of such devices, for stretching the fiber, or wrapping the fiber around a cylinder of piezoelectric material to which a varying voltage is applied; and c) coating the fiber with a metal, for example nickel, which is sensitive to electric or magnetic or acoustic fields, and exposing the fiber to such fields which are varied to stretch the fiber.

These methods have the drawback that they may not give a precise amount of stretch to the fiber and thus do not reliably alter the particular wavelengths of light passed or reflected by the grating. It is considered desirable to have a device which changes the length of a portion of fiber between precise limits, which limits will preferably be adjustable. Such a device can be used to switch the grating between two conditions. For example, in a bistable device, the light which is back reflected from a Bragg grating can be switched between two wavelengths, which can determine whether data is allowed to follow an express throughput path or whether it is back-reflected and re-routed.

Another drawback of some of the prior art devices is that in operation some of these have significant hysteresis losses, and therefore energy losses.

SUMMARY OF THE INVENTION

In accordance with the present invention, apparatus for modifying the optical characteristics of an optical fiber by controlled stretching of a length of the fiber, comprises:

a base;

first fiber holding means fixedly carried by the base and capable of firmly holding a first portion of the optical fiber;

a lever part attached to the base at a fulcrum;

second fiber holding means connected to the lever part and movable therewith, and capable of firmly holding a second portion of the fiber such that an intermediate length of the fiber may be held taut between the first and second holding means;

means for moving the lever part between first and second predetermined positions, so that the intermediate length of fiber is stretched as the lever part moves between the first and second positions. The latter means are preferably electromagnetic.

Where the fiber has a Bragg grating, the first and second fiber holding means will of course be located at portions of the fiber on opposite sides of the Bragg grating.

The lever preferably provides a considerable mechanical advantage, so that the movement of the outer end of the lever, which is controlled by adjustable stops, produces a much smaller amount of movement in the second, i.e. the movable fiber holding means. Preferably, the length of the lever part between the fulcrum and the electromagnetic means is at least 10 times the distance between the fulcrum and the second fiber holding means.

The fulcrum may be provided by a flexure which is integral both with the lever part and with a part of said base; this ensures that there is no play at the fulcrum and the movement is substantially frictionless, and energy losses are very small. Also, the lack of bearing surfaces means that this construction has a long life. Preferably, the lever part is releasably held in the first or second positions by magnetic latching means, which positions are determined by adjustable stops.

BRIEF DESCRIPTION OF THE DRAWINGS

A preferred embodiment of the invention will now be described with reference to the accompanying drawings, in which.

DETAILED DESCRIPTION

Figure 1A:
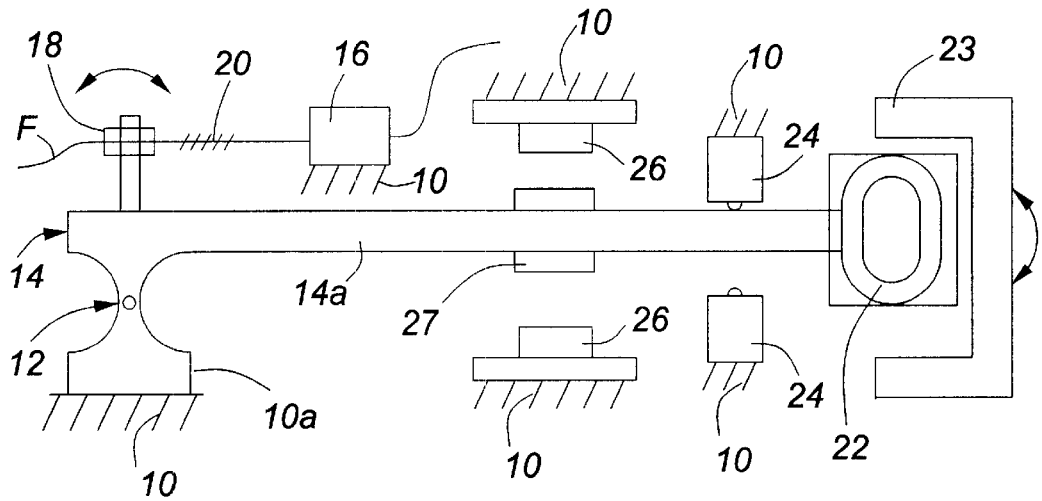
FIGS. 1a and 1b show a diagrammatic representation of this invention in alternate positions.
Figure 1B:
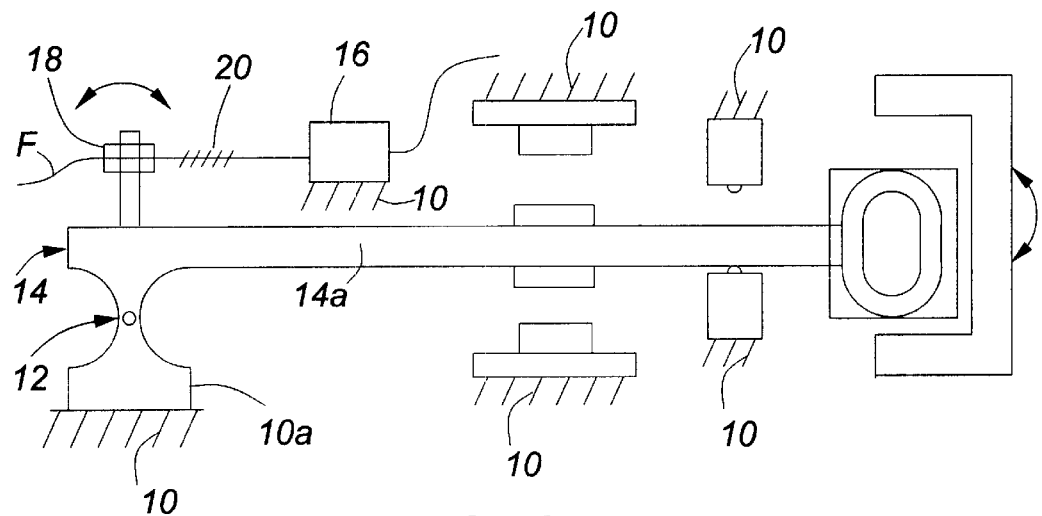
Figure 2:
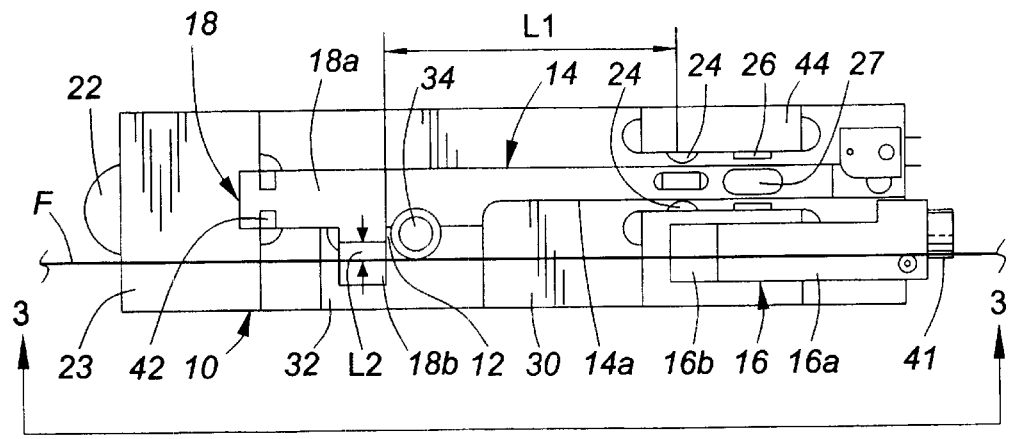
FIG. 2 is a plan view of the preferred embodiment of the fiber stretcher.
Figure 3:
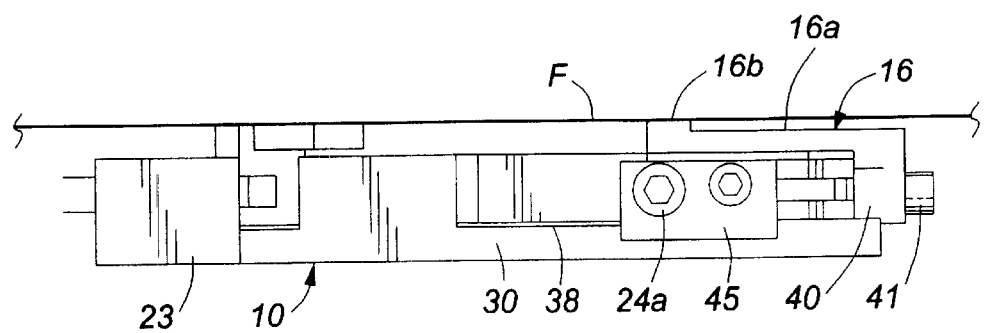
FIG. 3 is a side view of the same stretcher, on lines 3—3 of FIG. 2.
Figure 4:
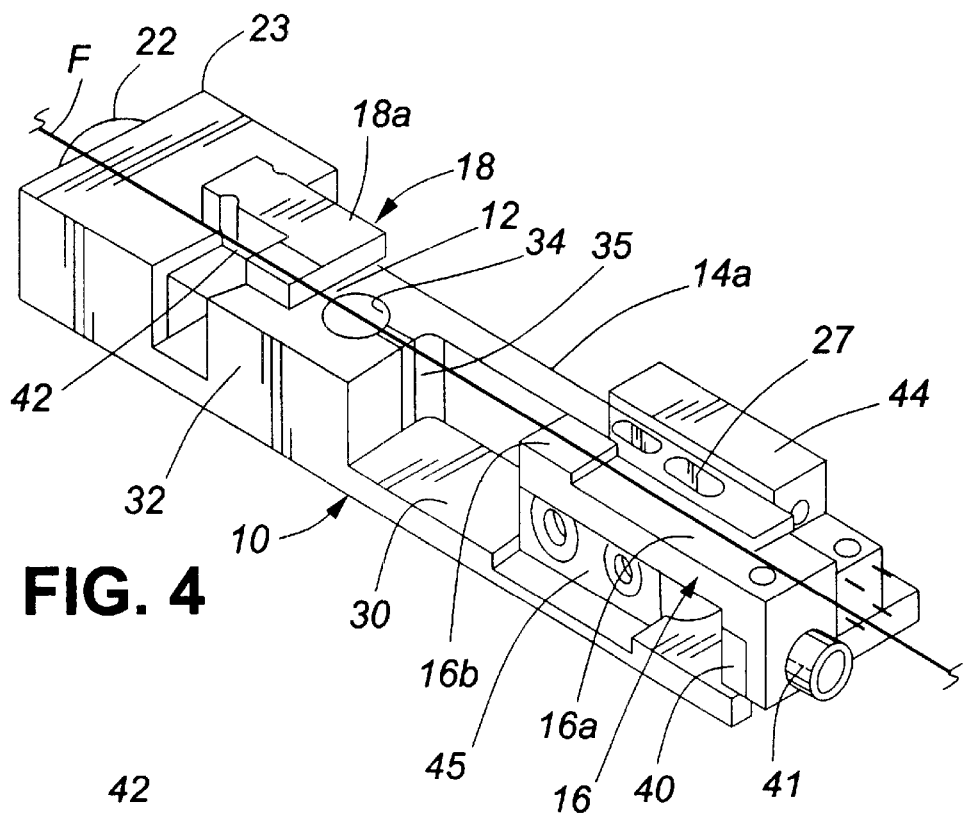
FIG. 4 is a perspective view of the same embodiment.
Figure 5:
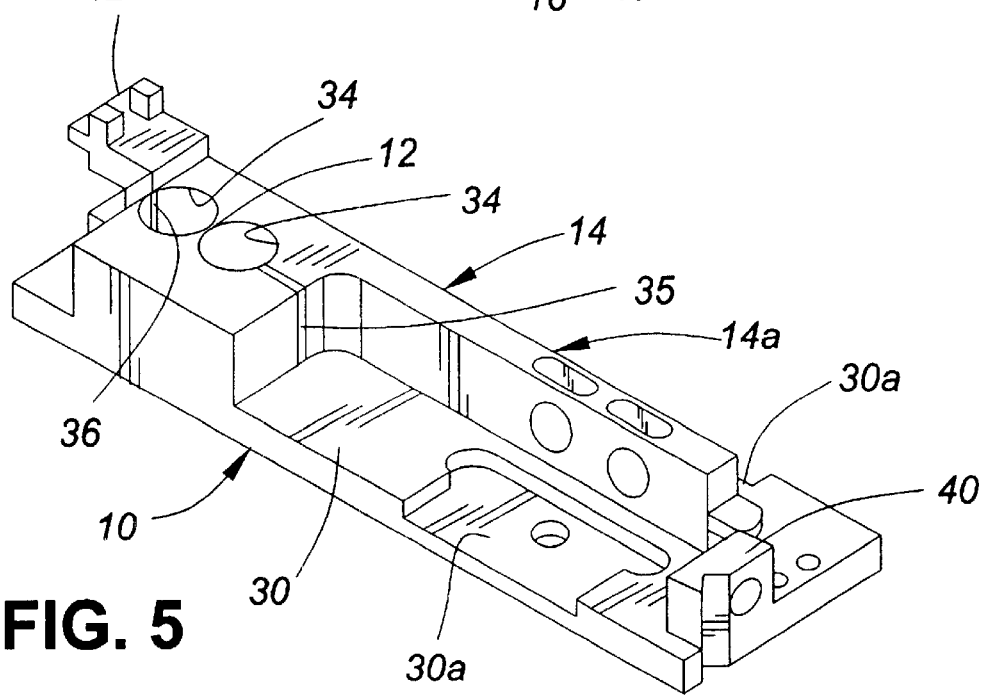
FIG. 5 is a perspective view of the base of the same embodiment and the lever arm to which it is connected.

FIG. 1 shows, diagrammatically, the stretcher as comprising a fixed base 10 of metal carrying support 10a, which is integrally connected by a thin metal web or flexure 12 to a lever part 14 having a lever arm 14a. The base 10 also supports fixed fiber holding means 16, for example a platform to which a portion of fiber F is bonded. A second, movable fiber holding means 18 is in the form of an arm movable with, and effectively forming part of, the lever part 14, and is bonded to a second portion of the fiber F. The intermediate length of fiber between those portions held by the holding means 16 and 18 has a Bragg grating indicated at 20; this portion of the fiber is held taut at all times and is stretched as the lever arm 14a moves from the FIG. 1b position to that of FIG. 1a.

Movement of the lever arm 14a is controlled by a coil 22 mounted for movement on the lever arm within a magnetic field produced by a yoke 23. The amount of movement of the lever is controlled by adjustable stops 24 situated at opposite sides of the outer end portion of the lever arm. The lever is made bistable in the two positions where it contacts the stops, and is magnetically latched by magnetic latching means in the form of permanent magnets 26 which attract a movable magnet 27 attached to the lever arm; the magnets are adjusted so that they are at all times out of contact with the magnet 27, and do not affect the range of movement of the lever arm.

It will be seen that this apparatus provides a bistable fiber stretcher which applies two levels of tension to the Bragg grating 20 depending on the position of the lever as determined by the coil 22.

However, while the preferred embodiment of the invention is a bistable device, i.e. one which latches in either of two stable positions, the invention is not limited to bistable devices, and with suitable latching mechanism might be used to give three or more stable states to provide a more complex switching pattern for the Bragg grating or other device incorporated in an optical fiber.

FIGS. 2 to 5 show a practical embodiment of the fiber stretcher in which references are used corresponding to those used in the diagrammatic FIGS. 1a and 1b.

The base 10 is a solid body of metal which is machined to provide a platform part 30 with an upstanding pedestal portion 32 integrally connected to the lever part 14 by the flexure 12 forming a fulcrum. The flexure is provided by a thin web of metal defined by the adjacent sides of two closely situated cylindrical bores 34 drilled perpendicularly to the flat underside the base platform 30. So that the lever part 14 is separated from the base, apart from its web connection, two slits 35, 36 are formed leading from the two outer sides of the two bores 34 to the opposite ends of the pedestal portion 32, and the underside of the lever part, including the lever arm 14a, is separated from the platform part of the base by a horizontal cut 38. The flexure 12 between the base part and the lever part allows substantially frictionless movement of the lever arm through a small angle, typically about 1°, with only a small amount of force being required to move the lever.

Integrally formed with an end of the base remote from pedestal 32 is an upstanding lug 40 which, by means of screw 41, carries the first, fixed fiber holder 16. This holder has an arm 16a extending towards the pedestal 32, the arm terminating in a platform 16b to which a portion of the fiber F is bonded. At the other end of the device a bracket 42 extending up from the pedestal end of the lever part 14 carries the outer end of the second, movable fiber holder 18 which has an arm 18a extending towards the first fiber holder and has, on its inner end, a platform 18b to which another portion of the fiber is bonded.

The lever part 14 has a rearwards extension behind (i.e. on the other side from lever arm 14a) the fulcrum where it has a recess holding an inner end of an electromagnetic coil 22 which is movable within a steel yoke 23. The fact that the lever part lies above one side of the base 10, while the yoke 23 is laterally aligned with the longitudinal center of the base, means that the coil is asymmetrically positioned in the magnetic field of the yoke and electrical signals supplied to the coil cause the coil to move the lever part back and forth about the flexure 12.

The outer end of the lever arm 14a extends between two blocks 44, 45, fitted into recesses 30a in the base platform 30 on opposite sides of the arm. These blocks hold, firstly, an opposed pair of adjustable stops 24, which are adjustable by screws 24a at the outer sides of the blocks 44, 45, and secondly the blocks hold an opposed pair of permanent magnets 26 which interact with a permanent magnet 27 mounted on the lever arm. This arrangement ensures that the lever arm is biassed into one of the two positions where it is in contact with one of the two adjustable stops 24; the magnets 26 remain out of contact with the central magnet 27.

The amount of stretching provided by this device can be accurately controlled, due to several factors, i.e.:
a) the use of a flexure at the fulcrum ensures that there is no unwanted movement of the lever; and
b) the stops 24 can be adjusted with reasonable accuracy, and the accuracy in respect of fiber stretching is increased by the mechanical advantage given by the use of a relatively long lever arm 14a and a short distance offset between the fulcrum and the fiber mounting position on the movable holder 18b. This mechanical advantage in effect reduces the effect of any inaccuracy in the setting of the stops 24.

Concerning b), preferably, the effective lever length L2 between the movable holding means 18b and the fulcrum, is typically less than 1/10 the length of lever arm L1 between the fulcrum and the stops 24, so that the motion of the fiber holding means is less than 1/10 that of the outer end portion of the lever.

Other electromagnetic means may be used to move the lever, for example a magnet movable in a coil, or a coil movable in a coil. Such means, and latching means, may be capable of providing more than two stable positions and thus more than a single degree of stretch for the fiber.

We claim:

1. Apparatus for modifying the optical characteristics of an optical fiber by controlled stretching of a length of the fiber, comprising:
   a base;
   first fiber holding means fixedly carried by said base and capable of firmly holding a first portion of said optical fiber;
   a lever part attached to said base at a fulcrum;
   second fiber holding means connected to said lever part and movable therewith, and capable of firmly holding a second portion of said fiber such that an intermediate length of said fiber may be held taut between said first and second holding means;
   means for moving the lever part between first and second predetermined positions, so that the intermediate length of fiber is stretched as the lever part moves between first and second positions.

2. Apparatus according to claim 1, wherein said means for moving the lever part are electromagnetic.

3. Apparatus according to claim 1, in combination with a fiber having a Bragg grating, wherein said first and second fiber holding means are located at opposite sides of said Bragg grating.

4. Apparatus according to claim 1 wherein said first and second predetermined positions are determined by stop means on opposite sides of said lever part.

5. Apparatus according to claim 4, wherein the length of said lever part between the fulcrum and the stop means is at least 10 times the distance between the fulcrum and the second fiber holding means.

6. Apparatus according to claim 1, wherein said fulcrum is provided by a flexure which is integral both with the lever part and with a part of said base.

7. Apparatus according to claim 1, wherein said lever part is releasably held in said first or second predetermined positions by magnetic latching means.

8. Apparatus for modifying the optical characteristics of an optical fiber by controlled stretching of a length of the fiber, which length includes a Bragg grating, comprising:

a base;

first fiber holding means fixedly carried by said base and capable of firmly holding a first portion of said optical fiber;

a lever part attached to said base at a fulcrum;

second fiber holding means connected to said lever part and movable therewith, and capable of firmly holding a second portion of said fiber such that an intermediate length of said fiber which incorporates the Bragg grating may be held taut between said first and second holding means;

means for moving the lever part between first and second predetermined positions, so that the intermediate length of fiber is stretched as the lever part moves between first and second positions, and magnetic latching means for releasably holding the lever part in said first or second positions;

and wherein the predetermined positions are provided by adjustable stops on opposite sides of said lever part.

9. Apparatus according to claim 8, wherein the length of said lever part between the fulcrum and the adjustable stops is at least 10 times the distance between the fulcrum and the fiber second holding means.

10. Apparatus according to claim 8, wherein said fulcrum is provided by a flexure which is integral both with the lever part and a part of said base.

* * * * *